United States Patent
Chan et al.

(10) Patent No.: US 6,378,070 B1
(45) Date of Patent: Apr. 23, 2002

(54) SECURE PRINTING

(75) Inventors: David Chan, Bristol (GB); Dipankar Gupta, Sunnyvale, CA (US); Bruno Edgard Van Wilder, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/227,162

(22) Filed: Jan. 8, 1999

(30) Foreign Application Priority Data

Jan. 9, 1998 (EP) ............................................. 98300144

(51) Int. Cl.⁷ .............................................. G06F 01/24
(52) U.S. Cl. ........................ 713/155; 713/165; 380/255
(58) Field of Search ................................ 380/255, 281; 713/155, 161, 165, 166, 171, 172, 182, 185, 200, 201

(56) References Cited

U.S. PATENT DOCUMENTS 5,596,718 A * 1/1997 Boebert et al. ............. 713/201
6,163,383 A * 12/2000 Ota et al. .................. 358/11.4
6,181,436 B1 * 1/2001 Kurachi ..................... 358/1.15

FOREIGN PATENT DOCUMENTS

| EP | 0 665 486 A2 | 8/1995 |
| GB | 2 267 986 A | 12/1993 |

* cited by examiner

Primary Examiner—Thomas R. Peeso

(57) ABSTRACT

In a distributed computing environment, a user is able to send a document to a secure printer (140) in such a way that only a specified intended recipient can print the document.

When the user specifies that the document is to be printed securely, a special print job is created in which the document is encrypted using a session key and a bulk encryption algorithm, and the session key is encrypted using the intended recipient's public key. Then, the encrypted session key, the encrypted document and an indication of the intended recipient's identity is transmitted to a print server (130), where the print job is held.

When the recipient's smart card (145) is inserted into a smart card reader of the secure printer (140), the recipient's identity, taken from the smart card (145), is transmitted to the print server (130). The print server uses the identity to search for and retrieve documents intended for the recipient. If the recipient is the intended recipient, the encrypted document and encrypted session key are transmitted to the secure printer (140). The secure printer (140) then forward the encrypted session key to the smart card (145), which decrypts the session key using an embedded private key. Then secure printer (140) receives and uses the session key to decrypt the encrypted document and, finally, prints the document for the recipient.

25 Claims, 4 Drawing Sheets

SECURE PRINTING

TECHNICAL FIELD

The present invention relates to hardcopy production of documents and particularly, but not exclusively, to document printing.

BACKGROUND ART

It is well known to generate or design a document using a computer-based text editing or graphics package, for example Microsoft™ Word or Microsoft™ PowerPoint respectively. Once generated, a document can be printed. Typically the package or a print driver formats the document into a printer file that can be received and interpreted by a printer. Example printer file formats are PCL or PostScript. Printer files can be sent directly by the package to a printer to be printed, or can be stored for printing at a later time.

This principle typically applies to all types of printer, for example laser printers, ink jet printers, impact printers and thermal printers, and in general to other hardcopy devices such as plotters or facsimile machines. Conveniently, herein, the term "printer" covers all such different types of printer, or other hardcopy or document rendering apparatus and devices.

Also, for the sake of convenience of description herein, the term "document" will hereafter be used to denote a document in any state, including (but not limited to) when viewed on a computer display, when formatted as a printer file ready for printing, and when in hardcopy form. The state the document is in at any point in the description depends on the context. Also, a "document" may include text, graphics or mixed representations.

The advent of distributed computer systems made it possible for a single 'network' printer to be used by multiple users. Typically, network printers are attached to computing platforms operating as print servers within distributed systems. Alternatively, some printers, given appropriate interfaces, can be arranged to connect directly to the network of a distributed system.

Network printers, whether connected directly, or via a print server, to a network, can provide a substantial cost advantage, since each user need not have his own printer connected to, or located near to, his own computer system.

The ability to access network printers, and other devices, from a local computer, is readily supported by operating systems such as Unix, or Microsoft's™ Windows™ NT, which are designed to be configured to manage distributed operations such as remote printing or data management.

One problem with printing documents on remote network printers is that any person near to the printer could remove or read printed documents containing sensitive information, which do not belong to them, before the intended recipients are able to retrieve the documents. One way around this is for users who need to print sensitive documents to arrange for a trusted person to stand by the printer while the document is printing and collect the document as soon as it has printed. This, of course, is inconvenient.

Another way to increase security is to print sensitive documents only on a local printer. The latter case, however, undermines any cost advantages gained in having a centrally located, network printer, especially if many users need to print sensitive documents.

Another problem associated with remote printing of sensitive documents is that a malicious party could intercept or monitor the transfer of data between the local computer and network printer. For example, anyone with access to a print spooler or print server receiving the document for printing could access the document. This would be highly undesirable and, again, could be overcome by using a local printer attached directly to the originating computer instead.

DISCLOSURE OF THE INVENTION

Aspects of the present invention aim to increase the security of remote printing.

According to a first aspect the present invention provides a method of printing a document in a distributed computer system comprising a client, a print server, printing apparatus and a network for interconnecting components of the distributed computer system, the method comprising the steps of:

a sender selecting a document to be printed, identifying an intended recipient for the document and causing the client to transmit to the print server the document accompanied by a first identifier for the intended recipient;

receiving and storing the document and the associated first identifier on the print server;

a recipient providing the printing apparatus with a second identifier, the printing apparatus receiving the second identifier and transmitting to the print server a request, including the second identifier, to receive documents from the print server;

the print server receiving the request, comparing the second identifier with the stored first identifier and, for matching identifiers, forwarding the document associated with the first identifier to the printing apparatus; and the printing apparatus receiving and printing the document.

Advantageously, a document is only printed when the intended recipient interacts with the printing apparatus in order to retrieve and print the previously-submitted document. In fact, the intended recipient may be the same person as the sender.

In a preferred embodiment, in order to increase security even further the client encrypts the document prior to transmitting it to the print server and the printing apparatus decrypts the encrypted document prior to printing it.

Thus, even if a document were intercepted during transfer between the client and the printing apparatus, say, it would be a non-trivial task for the intercepting party to decrypt the document.

Preferably, the printing apparatus interacts with a smart card in order to retrieve and/or decrypt the document using information and/or functionality programmed into a smart card provided by the recipient. The smart card may contain the second identifier and may be programmed to assist with document decryption.

According to a second aspect, the present invention provides printing apparatus arranged for receiving and printing documents, comprising:

an interface for connecting the printer to a print server;

an input/output means for interacting with a user and receiving an identity from the user;

processing means for generating a request for a document, the request including the identity of the user, transmitting the request to the print server and receiving a document from the print server; and means for printing the document for the user.

Further aspects, features and embodiments of the present invention will become apparent to the skilled addressee from the following detailed description and claims.

BRIEF DESCRIPTION OF THE INVENTION

Embodiments of the present invention will now be described, by way of example only, with reference to the accompanying drawings, of which:

BEST MODE FOR CARRYING OUT THE INVENTION, & INDUSTRIAL APPLICABILITY

Figure 1:
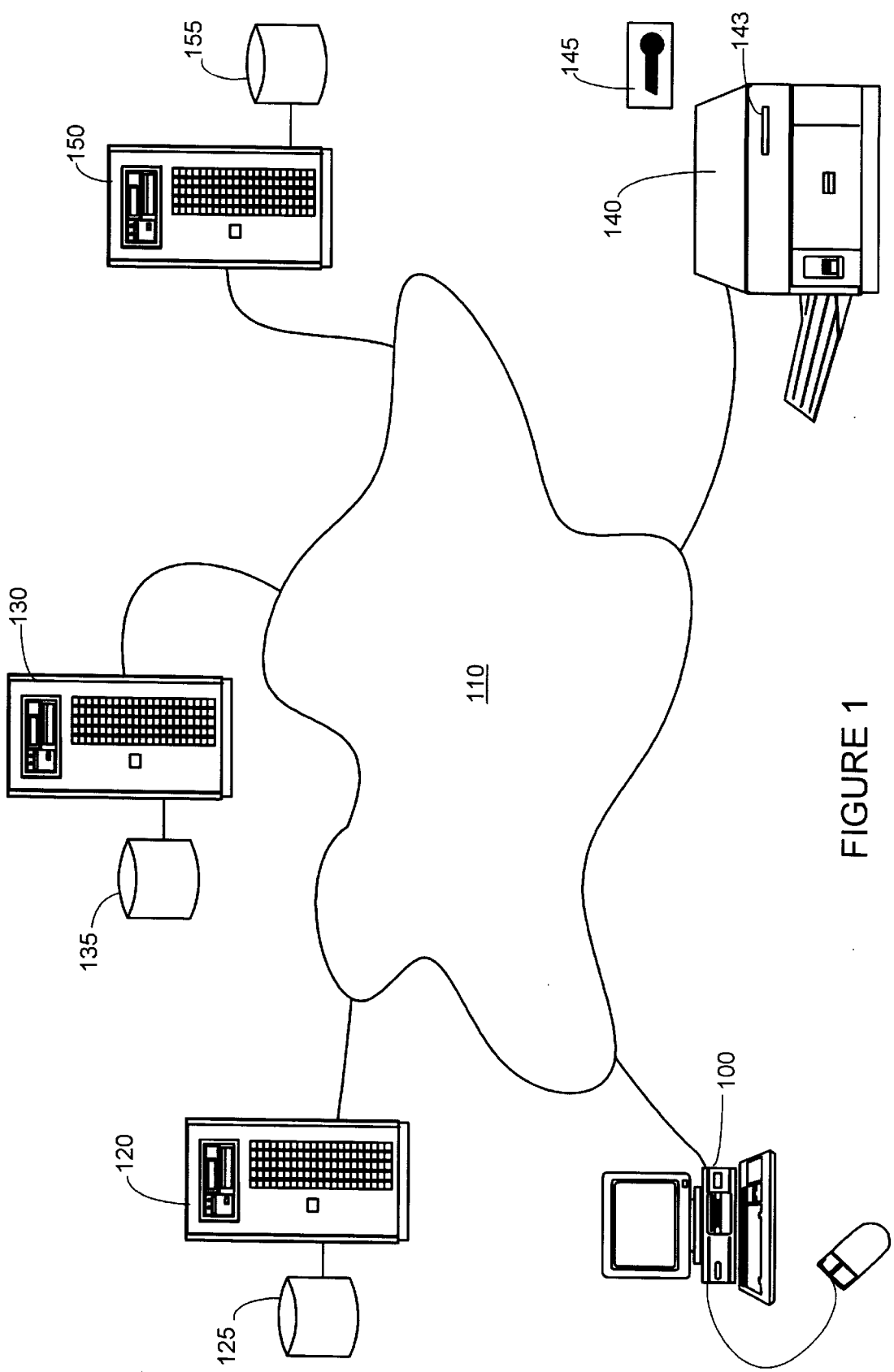
FIG. 1 is a diagram which illustrates a distributed computing environment which supports secure printing in accordance with an embodiment of the present invention.

In FIG. 1, a local computer 100, for example an Intel Pentium based computer operating under Windows NT 4.0, includes the standard components of a keyboard, a display and a mouse (none of which are shown). The local computer 100 is attached to a network 110, for example a network supporting the TCP/IP protocol. The local computer 100 provides a secure printer process, or client, which is a software routine that can be initiated by a user when secure printing is required. The process, and all other processes in this embodiment, can be written in any general purpose programming language, such as C++.

Also connected to the network 110 are a directory server 120, a document store 130, a secure printer 140 and billing engine 150.

The directory server 120 is a process running on a computer, which has access to a database 125 of user-specific information, known as user-profiles. The directory server 120 is arranged to receive from requesting processes requests for specific information for particular users, and returns the specific information to the requesting process, whenever possible. The computer running the directory server 120 could be a Unix or Windows NT platform connected to the network 100 via an appropriate interface. The directory server 120 in the present embodiment is a simple database, which receives enquiries and returns relevant data, but it could be based on purpose-built directory services such as Novell's NDS or Microsoft's Active Directory. In accordance with the present embodiment, the directory server 120 is configured to receive a request including a user identity and return at least a public encryption key associated with the identified user. Communications with the directory server 120 may be with a network protocol such as the Lightweight Directory Access Protocol (LDAP).

The document store 130 is a process running on a computer which receives and stores encrypted document files and associated user identities. The document store 130 also receives requests to forward to specified locations encrypted document files having a specified identity. Again, the computer running the directory server 120 could be a Unix or Windows NT platform connected to the network 100 via an appropriate interface.

In practice, the document store 130 can be a modified print spooler or print server process, which has access to a large amount of data storage, for example provided by a disk drive 135. The spooler or server is modified in the respect that it is arranged to recognise encrypted documents and, rather than forwarding them to a specific printer, hold or store the encrypted documents. The spooler or server is also modified to receive requests from printers for specific encrypted documents, search for the specified encrypted documents and transfer the encrypted documents to the requesting printer.

It should be noted that the document store 130 in the present embodiment is an untrusted part of the distributed system, in that the document store 130 is configured to return documents to any requesting printer, or other device using an appropriate protocol. The present embodiment relies on the security of the strong encryption applied to the document to protect the information in the document.

In other embodiments, where security is even more important, it is envisaged that the document store 130 would further incorporate authentication functionality, which would allow the document store to authenticate either the requesting printer or smart card user. Authentication systems using, for example, digital signatures are well known and will not be considered herein in any more detail.

Figure 2:
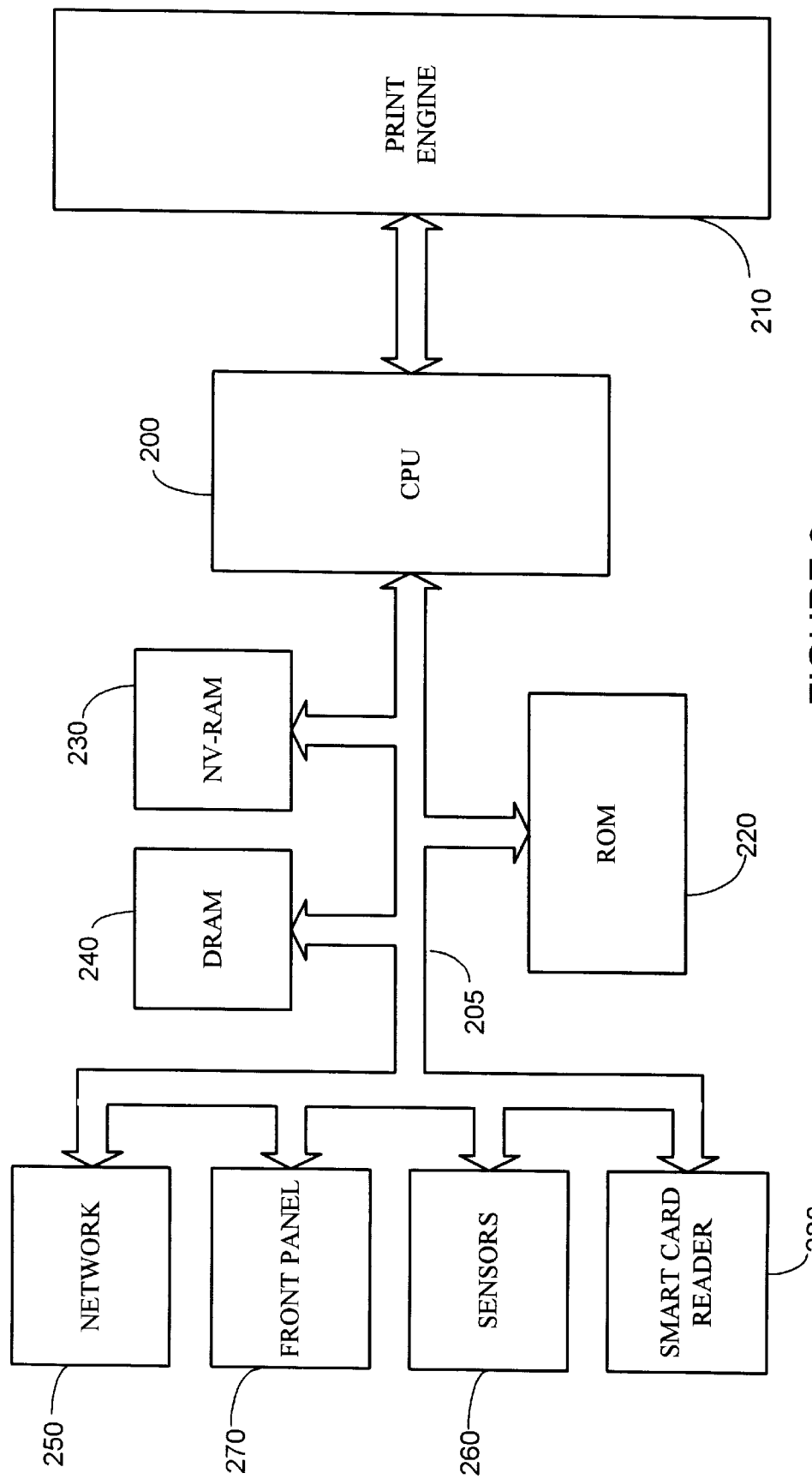
FIG. 2 is a block diagram of an architecture for a printer according to the present embodiment.

The architecture of the printer 140 according to the present embodiment is illustrated in more detail in FIG. 2. FIG. 2 illustrates a central processing unit (CPU) 200 that controls a print engine 210, which is a standard part of any printer that enacts printing, and the details thereof are beyond the scope of the present description. A read only memory (ROM) 220 is connected to the CPU 200 by an appropriate system bus 205. The ROM 220 contains the instructions that form the control program for the printer. Also connected to the system bus 205 is non-volatile memory (NV-RAM) 230 and main memory (DRAM) 240. The NV-RAM 230 can be EEPROM or Flash RAM for receiving and storing services downloaded into the printer. The DRAM 240, is used by the printer as buffer memory, for receiving jobs to be printed, and is also used by the CPU 200 in the present embodiment as workspace for decryption and session key storage. All the features of the printer 140 described so far are standard on many generally available printers. The diagram also illustrates the standard printer features of a network interface 250, various sensors 260, for example 'paper out', and a front panel display and keypad 270, all connected to the CPU via the system bus 205. Finally, a smart card reader 280 is provided, also connected to the system bus 205, although it could alternatively be connected via the printer's RS232 port, where one is available. Thus, the only significant, non-standard hardware feature of the printer is the smart card reader 280. The other differences depend on software or firmware processing.

Smart card readers are generally available and conform to accepted standards. The smart card reader used in the present embodiment supports the ISO 7816 standard (levels 1 to 4), and some extra functionality not covered by the ISO standard, which is described herein. Corresponding smart cards are also readily available, and are programmable to operate as described herein.

In practice, the smart card reader can be incorporated into the casing of a standard printer. Thus, in this case, the only significant, noticeable difference about the printer is a slot 143 in the casing into which a smart card 145 can be inserted and retrieved.

Printers which generally have the features illustrated in FIG. 2 are a Hewlett-Packard LaserJet 5 or a Hewlett-Packard LaserJet 4000. In either printer, the printer's conventional control program can be modified as described herein, by either replacing the printer's firmware, in ROM 220, or by creating a 'service', which can be downloaded into the printer's flash memory, NV-RAM 230, from the network.

Details on how to modify control programs in Hewlett-Packard and others' printers are beyond the scope of the present description, but are readily available from Hewlett-Packard Company or from the respective other printer manufacturers.

The foregoing description describes a printer with an integral smart card reader, wherein the printer itself is programmed with functionality to retrieve and process encrypted documents. In an alternative embodiment, printing apparatus may be provided comprising a general purpose printer and an external smart card reader unit connected to the printer via a serial port. The smart card unit is also provided with a network interface, for connecting the unit to a network, and an appropriately programmed processor and memory to enable the combination of the general purpose printer and the smart card reader unit to operate as printing apparatus according to the present invention. In effect, the smart card reader unit is designed to interact with the recipient, who inserts his smart card, interact with the document store 130 to retrieve and decrypt the session key and the encrypted document, and forward the document to the printer to be printed.

Clearly, this embodiment does provide a weak link in the security of the overall system, by passing the unencrypted document over the communications link between the smart card reader unit and the printer. However, it is believed that the associated risks are minimised when the printer and smart card reader unit are co-located.

Such an arrangement may be preferable where a business wishes to utilise the invention in a cost effective way using existing printing equipment. It is also envisaged that the functionality in the printer and the smart card reader unit necessary to implement the invention may be partitioned in other ways, depending on the circumstances.

The billing system 150 is a process running on a computer which electronically bills users of the secure printing system. There are three main areas where users could be billed, which are for: submission of an encrypted document to the document store 130, storage by the document store 130 of a document for a specified time; and transmission and successful printing of the document. Other acts, such as using the directory server 120, could potentially also be billed. The sender or the recipient, or both, could be billed for any or each of these acts. For example, the sender could be billed for the submission, and the recipient could be billed for the storage and printing of the document. Of course, the sender and the recipient might be the same person, or different people from the same organisation, in which case a single person or organisation respectively would be billed for everything. Further, the owner of the document store and the owner of the printer might be different independent service providers. For example, in the case where the printer is in a public place, and is for use by the public, then the printer's owner would want financial reward for providing the service. Therefore, it would be necessary for a printer to identify itself in enough detail that the billing system 150 could allocate billed funds to the printer's owner.

For every act, it is necessary to identify the party to be billed and the party to be paid. Electronic identification and authentication for the purposes of electronic billing are well known in the field of electronic commerce, and will not therefore be discussed in any more detail herein.

The operation of the local computer 100 in submitting a secure print job will now be described with reference to the flow diagram in FIG. 3.

Figure 3:
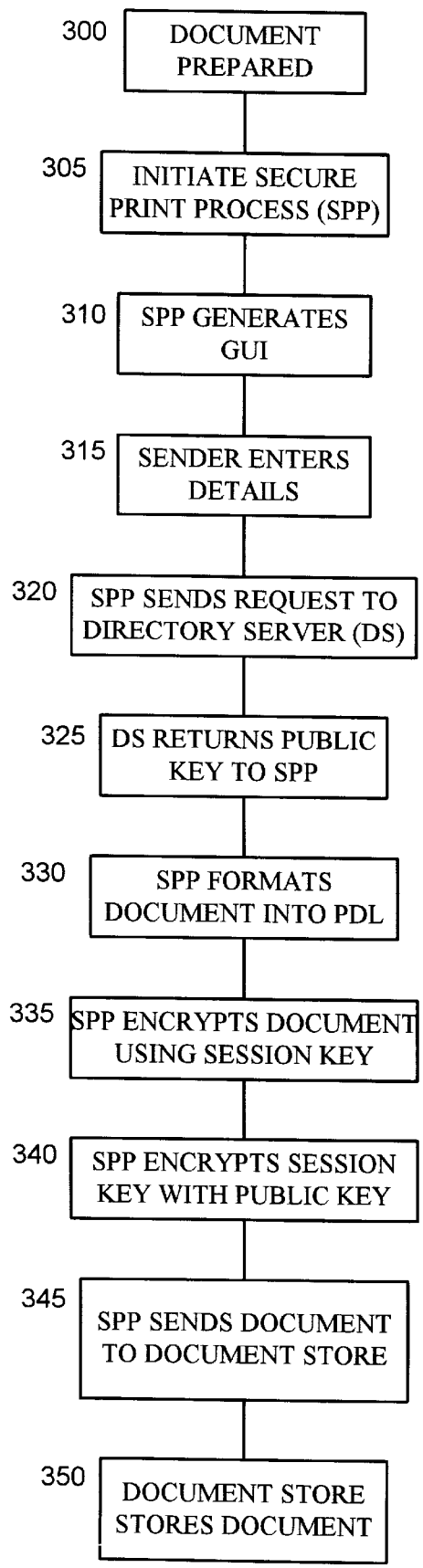
FIG. 3 is a flow diagram which illustrates the steps involved in a user submitting a document for secure printing.

In step 300 of FIG. 3, the local computer's operator (not shown), in other words the document's sender, has a document, for example a word-processed document, to be submitted for printing. The sender initiates the secure printing process for the secure printing of the document, in step 305. The secure printing process, in step 310, generates a graphical user interface, which requires the sender to enter the document details and the identity of the intended recipient. Of course, the intended recipient might be the sender himself. The sender enters the required details in step 315. Having received a valid input from the sender, the process, in step 320, continues by transmitting a request including the details input by the sender to the directory server 120. In response, the directory server 120 returns to the secure printing process the public key for the intended recipient, in step 325.

Next, in step 330, the secure printer process formats the document into a page description language, such as PostScript or PCL, which is interpretable by a printer. Obviously, the language will depend on the type of printer or other hardcopy apparatus to be used. The secure printer process then, in step 335, applies bulk encryption to the formatted document while retaining its integrity. This can be achieved using a message digest function such as the Secure Hash Algorithm (SHA-1) and a symmetric block or stream cipher, for instance, Data Encryption Standard (DES). The cipher uses a random number generated by the secure printer process to enact the encryption. The random number constitutes a session key. This step is a symmetric encryption step, which relies on a recipient having access to the session key to decrypt the document.

Alternative message digest algorithms, such as MD5, symmetric ciphers such as CAST or IDEA, and asymmetric algorithms such as the Elliptic Curve ElGamal encryption scheme can be used instead of the algorithms specified earlier.

In step 340, the secure printer process then applies an asymmetric encryption algorithm, such as RSA, to the session key, using the intended recipient's retrieved public key. Thus, after this step, only someone who has knowledge of the private key associated with the public key can decrypt the session key and hence then decrypt the document.

In some embodiments, where the whole procedure is enacted within the bounds of a relatively trusted or secure environment, it might be felt unnecessary to use the encryption stages. In such cases, for example where the messages are never transmitted outside of a single building, it might be sufficient to arrange that a document is only printed when a recipient is available at the printer.

In step 345, the secure printing process forwards across the network 110, to the document store 130, a message comprising the encrypted document, an 'envelope' for the document (which contains the encrypted session key), and the respective identity of the intended recipient.

Finally, in step 350, the document store 130 receives the message and stores it appropriately to hard disk 135.

The process of securely printing a document retrieved from the document store 130 will now be described with reference to the flow diagram in FIG. 4.

Figure 4:
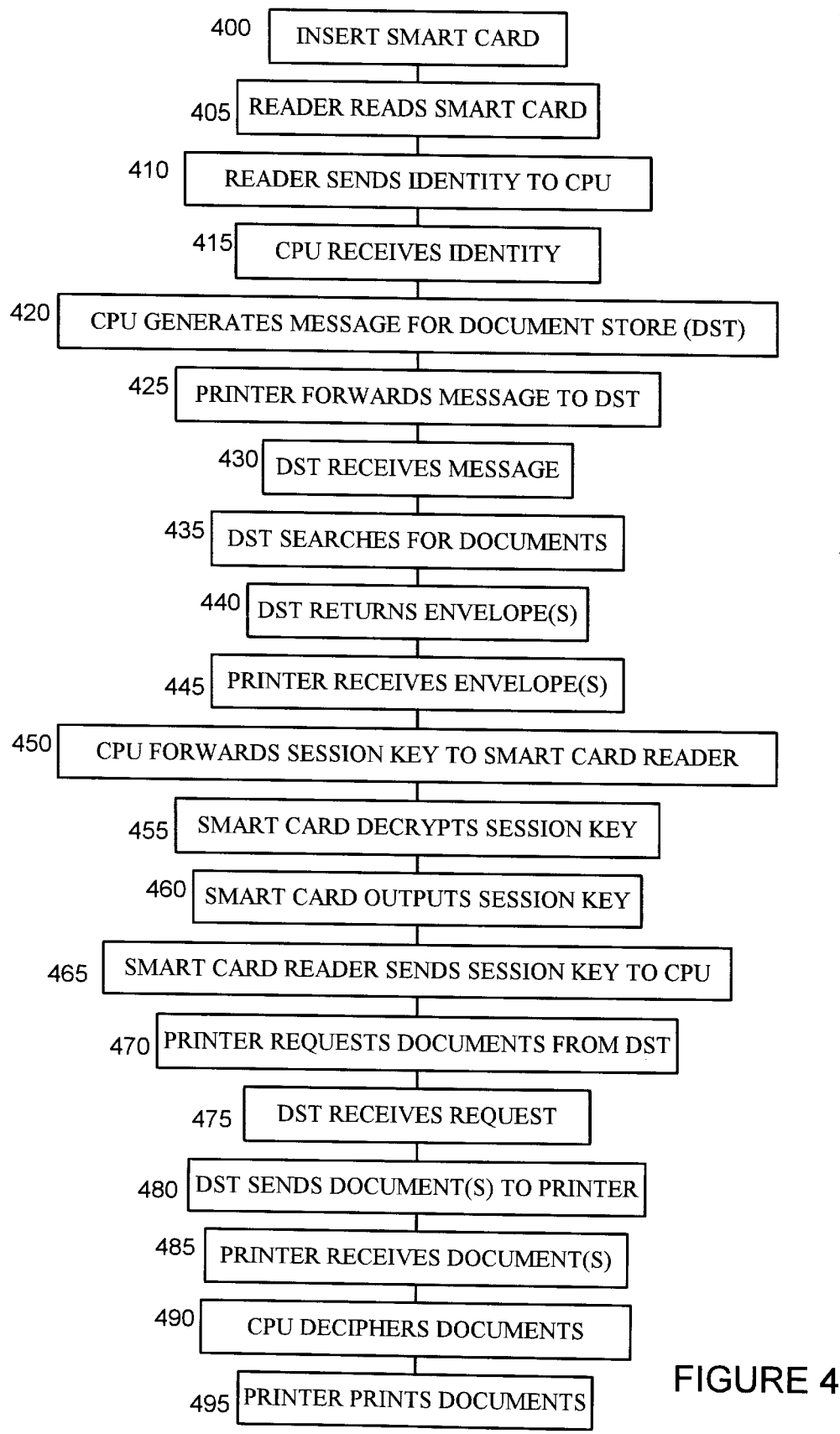
FIG. 4 is a flow diagram which illustrates the steps involved in a secure printer retrieving and printing a print job.

In step 400 of FIG. 4, the intended recipient of the document, which has been stored by the document store 130 as described already, inserts his smart card into the smart card reader 280 of the secure printer 140. The smart card includes the recipient's identity and the recipient's private key. Although not illustrated in the flow diagram, it would be typical at this stage for the printer 140 to request entry by the recipient of a personal identification number, to verify that the recipient is the genuine owner of the smart card, and not someone who has found, or even stolen, it.

The smart card reader 280 reads the smart card, in step 405, and extracts the identity therefrom. Then, in step 410, the smart card reader 280 forwards the identity to the printer's CPU 200. The CPU 200 receives the identity in step 415 and generates a message including the identity, in step 420, which it forwards to the document store 130 in step 425.

In step 430, the document store 130 receives the message and, in step 435, searches the hard disk 135 for any documents having the same identity. In the present embodiment, the document store 130 will find one document. However, in general, there may be none, or any number of documents having a matching identity stored on the hard disk 135. At this stage, the document store 130 and printer 140 may be arranged to interact to provide status information to the recipient, displayed on a front panel display 270 of the printer, for example showing the number of documents awaiting printing, or that there are no documents waiting. Additionally, the recipient may even be given a choice of which (of several) documents he would like to retrieve.

Next, in step 440, the document store 130 returns to the printer 140 only the envelope for the document having the matching identity. In principle, the document could be sent at this stage as well, although whether or not this is done depends on the size of the document and the amount of available printer buffer memory. It is believed preferable at present to retrieve only the envelope, unless the printer 140 has a significant amount of RAM 240 into which the whole document could be received.

In step 445, the printer receives the envelope and, in step 450, forwards the encrypted session key to the smart card reader 280. The smart card reader 280 transfers the encrypted session key to the smart card, and the smart card, in turn, decrypts the session key, in step 455, using the private key stored therein. The smart card outputs the decrypted session key, in step 460, and the smart card reader 280 forwards the session key to the CPU 200, in step 465.

This technique for retrieving the session key is extremely advantageous, since the private key never needs to leave the smart card, and thus remains secret even from the printer.

The printer 140 forwards a message to the document store 130, in step 470, for the document store to transmit the encrypted document to the printer 140. In step 475, the document store 130 receives the message and, in step 480, transmits the document to the printer 140. In step 485, the printer 140 receives the document and, in step 490, deciphers it back into page description language using the session key.

Finally, in step 495, the printer prints the document for the intended recipient.

It is envisaged that, alternatively, the smart card itself might be programmed to enact the decryption of the document. This, of course, is design decision.

It will be appreciated that the network 110 could be a local area network, a wide area network or even global area network. For example, for the case of a global area network, the local computer 100 could be situated in an office in London and the printer could be located in an airport in Tokyo or New York. Similarly, the directory server 120 and the document store 130 could be located anywhere in the world.

In some embodiments, for responsiveness purposes, it may be desirable to have mirror document stores (not shown)-similar to Internet mirror sites-where the data in one store is copied by the store to other, geographically distant document stores. Thus, for example, there may be a London-based data server, and Tokyo and New York-based data servers. On receiving a document, the London data server would copy the document to both the Tokyo and New York data servers so that the recipient could retrieve and print the document from the data server nearest the printer being used. Obviously, the data mirroring could be tuned if it is known where the recipient is most likely to be when he wishes to print the document. For example, if the recipient were likely to be in New York, but might instead be in London, then a document submitted in London would only be mirrored to the New York-based data server. Such recipient location information could form part of the user profile information stored by the directory server 120. Thus, the location information under these circumstances would also be returned to the local computer 100 with the public key information, and this information would also be forwarded to the document store 130.

It is envisaged that the directory server 120 will hold other user profile information. For example, a recipient may only ever wish to receive documents from one specified printer. In this case, the information returned by the directory server 120 would reflect this and the document store 130 would then only release the encrypted document to the specified printer. Other information held by the directory server 120 for particular users might include printer information, which determines how the document is formatted by the local computer 100, for example whether to format the document into PostScript or PCL. In general, it is expected that the user can access the directory server 120, for example via the Internet, and modify his user profile whenever required.

It will also be appreciated that the components and processes described above need not reside on different computers. For example, the local computer 100 could support directory server and document store processes, as well as a secure printer process.

Furthermore, there is no reason why any or all of the processes described herein could not be located and called from any of a number of different computer systems connected to the distributed environment. Having said this, it is important, although not essential (as exemplified in the alternative embodiment described above), that documents that require secure printing do not pass across any publicly accessible or low security communications channels, without being in an encrypted state.

What is claimed is:

1. A method of printing a document in a distributed computer system having a client, a print server, printing apparatus and a network for interconnecting components of the distributed computer system, the method comprising the steps of:

a sender selecting a document to be printed, identifying an intended recipient for the document and causing the client to transmit to the print server the document accompanied by a first identifier for the intended recipient;

receiving and storing the document and the associated first identifier on the print server;

a recipient providing the printing apparatus with a second identifier, the printing apparatus receiving the second identifier and transmitting to the print server a request, including the second identifier, to receive documents from the print server;

the print server receiving the request, then comparing the second identifier with the stored first identifier and for only matching identifiers, forwarding the document associated with the first identifier to the printing apparatus; and the printing apparatus receiving and printing the document.

2. A method according to claim 1, wherein the client encrypts the document prior to transmitting it to the print server and the printing apparatus decrypts the encrypted document prior to printing it.

3. A method according to claim 2, wherein the recipient provides the printing apparatus with means necessary for decrypting the encrypted document.

4. A method according to claim 3, wherein the printing apparatus interacts with a smart card in order to retrieve and/or decrypt the document using information and/or functionality programmed into a smart card provided by the recipient.

5. A method according to claim 4, wherein the smart card provided by the recipient stores data including said second identifier and the printing apparatus extracts the second identifier from the smart card.

6. A method according to claim 4, wherein the smart card, which is programmed with a decryption algorithm and stores a secret, receives encrypted information from the printing apparatus, decrypts the encrypted information using the secret and returns the decrypted information to the printing apparatus.

7. A method according to claim 6, further comprising the client:
encrypting the document using a first key, the first key being the key of a symmetric encryption algorithm;
encrypting the first encryption key using a second key, the second key being the public key of an asymmetric encryption algorithm; and
transmitting to the print server the encrypted document and the first identifier accompanied by the associated encrypted first key.

8. A method according to claim 6, wherein the client obtains the second key from a key repository on the basis of the identity of the intended recipient.

9. A method according to claim 7, further comprising the printing apparatus:
receiving the encrypted first key from the print server in response to the request;
forwarding the encrypted first key to the smart card such that the smart card decrypts the encrypted first key using the secret and returns the first key tot he printing apparatus, the secret being the private key of the asymmetric encryption algorithm; and
using the first key to decrypt the encrypted document.

10. Printing apparatus configured for operation according to the method of claim 1.

11. A client configured for operation according to the method of claim 1.

12. A print server configured for operation according to the method of claim 1.

13. A distributed computing system configured for operation according to the method of claim 1.

14. Printing apparatus for use in a distributed computer system responding to a client, and having (a) a print server, (b) the printing apparatus and (c) a network for interconnecting components of the distributed computer system, the system enabling (a) a sender to select a document to be printed, (b) an intended recipient for the document to be identified, (c) the client to transmit to the print server the document accompanied by a first identifier for the intended recipient, and (d) the print server to receive and store the document and the associated first identifier;
the printing apparatus comprising a receiver for a second identifier and a transmitter for transmitting to the print server a request, including the second identifier, to receive documents from the print server;
the print server being arranged for receiving the request, then comparing the second identifier with the stored first identifier and, for only matching identifiers, forwarding the document associated with the first identifier to the printing apparatus; and
the printing apparatus receiver being arranged for receiving and printing the document forwarded to the print server.

15. Printing apparatus according to claim 14, wherein the receiver is arranged for receiving and decrypting an encrypted document received from the print server.

16. Printing apparatus according to claim 15, wherein receiver and transmitter are included in an input/output arrangement arranged to receive a removable processing arrangement from the user, the removable processing arrangement being able to decrypt the encrypted document.

17. Printing apparatus according to claim 16, wherein the input/output arrangement comprises a smart card reading device for a receiving smart card from a user of the printing apparatus.

18. Printing apparatus according to claim 17, wherein the smart card reading device is arranged to extract the identity of the user from the smart card.

19. Printing apparatus according to claim 17, wherein the smart card reading device is arranged to forward encrypted information to the smart card and receive back from the smart card unencrypted information, the smart card being arranged to receive encrypted information, decrypt the encrypted information using a secret stored on the smart card and return the decrypted information.

20. Printing apparatus according to claim 19, wherein:
the receiver is arranged to receive from the print server, in response to the request, an encrypted first key;
the transmitter is arranged to forward the encrypted first key to the smart card such that the smart card decrypts the encrypted first key using the secret and returns the first key; and further including a
decrypter for the encrypted document using the first key.

21. Printing apparatus according to claim 17, further comprising a casing configured to contain the components of the printing apparatus including an integrated smart card reader, the casing having a slot therein for receiving a smart card through the casing into the smart card reader.

22. Printing apparatus according to claim 17, further including an interface and a smart card reading device connected to the printer via the printer interface.

23. Printing apparatus according to claim 22, wherein the smart card reading device comprises an interface for connecting the device to the smart card reading network.

24. Printing apparatus according to claim 23, wherein the smart card reading device comprises:
an extractor of the user identity from the smart card;
a generator and transmitter of the request via the network to the print server;
a receiver from the print server of an encrypted document and an encrypted key;
a transmitter of the encrypted key to the smart card, such that the smart card decrypts and returns the key;
a decrypter of the encrypted key to the smart card, such that the smart card decrypts and returns the key; and
a transmitter to the printer of the document to be printed.

25. A smart card reading device configured for operation with printing apparatus according to claim 22.

* * * * *